J. C. Warr.
Straightening Metal Bars.
N° 93,256. Patented Aug. 3, 1869.

Witnesses
S. N. Piper
J. R. Snow

Inventor;
James C. Warr.
by his attorney
R. H. Eddy

United States Patent Office.

JAMES C. WARR, OF WAREHAM, MASSACHUSETTS.

Letters Patent No. 93,256, dated August 3, 1869.

IMPROVED STRAIGHTENING-MACHINE.

The Schedule referred to in these Letters Patent and making part of the same.

*To all persons to whom these presents may come:*

Be it known that I, JAMES C. WARR, of Wareham, of the county of Plymouth, and State of Massachusetts, have invented a new and useful Machine for Straightening Round Bars of Metal; and do hereby declare the same to be fully described in the following specification, and represented in the accompanying drawings, of which—

Figure 1:
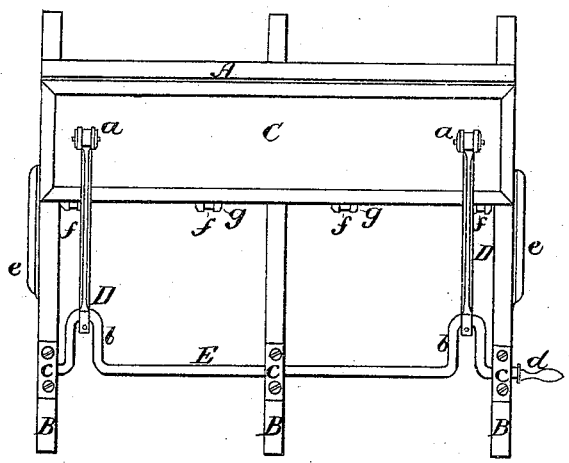
Figure 2:
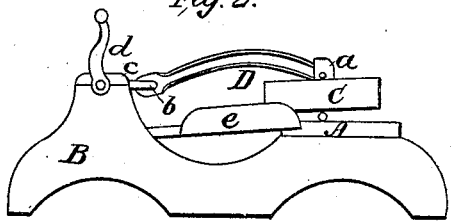
Figure 3:
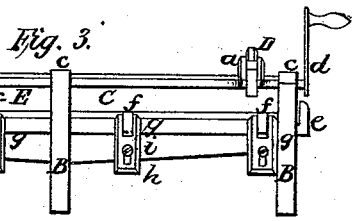
Figure 4:
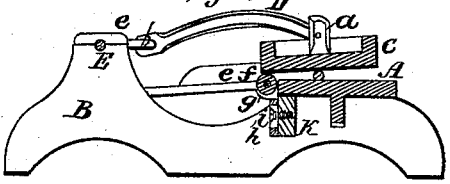

Figure 1 is a top view;
Figure 2, an end elevation,
Figure 3, a rear elevation,
Figure 4, a transverse section of it.

In such drawings—

A denotes a table or flat plate, of metal, supported on three or any other proper number of feet or standards, B B B, formed and arranged in manner as represented.

Over the bed or table A is a platen, C, which is, as shown in the drawings, a shallow rectangular box, provided with two short posts, $a\ a$, erected on its bottom, and hinged to the connecting-rods D D, leading from two bell-cranks $b\ b$, of a horizontal shaft, E.

The said shaft is supported in suitable boxes, $c\ c\ c$, and provided with a crank, $d$, or other proper means for putting it in revolution.

Guides $e\ e$ may be fixed to the outer standards B B. They serve to maintain the platen in a rectilinear path while it may be in movement.

There is applied to the bed, and in rear of it, a series of wheels or rollers, $f\ f\ f\ f$, each of which is supported within an adjustable carrier, $g$, such carrier being slotted, as shown at $h$, and held in position by a clamp-screw, $i$.

The said screw goes through the slot, and is screwed into one of a series of brackets, $k$, extended down from the bed, the whole being so as to enable the several rollers to be adjusted to any desirable altitude, such depending on the diameter of the rod to be rolled between the platen and bed.

These rollers, as described, are for supporting the platen, and enabling it to be moved readily over the bed.

It will be observed that the middle of the posts of the platen is, or may be, arranged a little in advance of its medial line, in order that the platen may assume a slightly-inclined position while moving backward, the same being in order that it may readily take upon a rod or round bar when placed on the table or bed for the purpose of being rolled or straightened by the conjoint action of the platen and bed.

The platen, preparatory to being used, is to be laden with weights, placed within or upon it, so as to cause it, while in movement on a rod, to press down upon it with a sufficient degree of force to remove from it any bends or flexures which it may have.

In operating the machine, a round rod or bar of metal to be straightened, while in either a heated or in a cold state, is to be laid on the table, and pushed sideways underneath the platen, which, as it may continue to move, will ride upon the rod, and roll it along upon the table, and, in so doing, will remove from it any bend or flexure which it may contain.

A machine of the above kind has been found to be very efficient for the purpose for which it is intended. Heretofore the practice of straightening round bars of iron has been by bending them, or by striking upon them with a hammer, it being, at least, a tedious and uncertain process. With my machine, the straightening of a rod is a matter of great ease and certainty, comparatively speaking.

I am aware of the machine which is described in the United States patent, No. 60,260, dated December 4, 1866, and I make no claim thereto. In my machine, I employ a rocker-platen, with adjustable rollers, for supporting it, and adjusting it with reference to the bed, whereas the patented machine has to its platen a mechanism which constantly maintains its lower surface in parallelism with the bed, and renders it necessary to keep setting down the screws of such mechanism, in order to effect the proper adjustment of it, and the reduction of the rod.

By having the platen to rock and run on rollers arranged with the bed, and adjustable, as described, the platen is rendered self-adjusting to the rod, and will operate to better advantage. Therefore,

What I claim as my improvement or invention, is—

The combination and arrangement of the adjustable rollers $f$ with the bed A, and with the platen G, substantially in manner as represented, and so as to operate therewith, as and for the purpose described.

J. C. WARR.

Witnesses:
R. H. EDDY,
S. N. PIPER.